United States Patent
Kim et al.

(10) Patent No.: US 10,133,365 B2
(45) Date of Patent: Nov. 20, 2018

(54) IMAGE DISPLAY APPARATUS AND METHOD OF DISPLAYING IMAGE

(71) Applicant: SAMSUNG ELECTRONICS CO., LTD., Suwon-si, Gyeonggi-do (KR)

(72) Inventors: Hye-ryung Kim, Seongnam-si (KR); Yoo-jin Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 23 days.

(21) Appl. No.: 15/375,465

(22) Filed: Dec. 12, 2016

(65) Prior Publication Data

US 2017/0262072 A1    Sep. 14, 2017

(30) Foreign Application Priority Data

Mar. 10, 2016    (KR) .................. 10-2016-0029103

(51) Int. Cl.
*G06F 3/0346* (2013.01)
*G06F 3/0482* (2013.01)

(52) U.S. Cl.
CPC .......... *G06F 3/0346* (2013.01); *G06F 3/0482* (2013.01)

(58) Field of Classification Search
CPC combination set(s) only.
See application file for complete search history.

(56) References Cited

U.S. PATENT DOCUMENTS

| | | | |
|---|---|---|---|
| 2011/0265022 A1* | 10/2011 | Kamiyama | G06F 3/0486 715/769 |
| 2012/0131518 A1* | 5/2012 | Lee | G06F 3/011 715/863 |
| 2012/0159398 A1* | 6/2012 | Kurosawa | G06F 3/0482 715/841 |
| 2014/0143723 A1* | 5/2014 | Ording | G06F 3/04842 715/823 |
| 2015/0113483 A1* | 4/2015 | Van Der Westhuizen | G06F 3/04812 715/850 |
| 2015/0289104 A1 | 10/2015 | Jung et al. | |
| 2016/0041723 A1* | 2/2016 | Ren | G06F 3/04842 715/765 |
| 2017/0153771 A1* | 6/2017 | Chu | G06F 3/0482 |

* cited by examiner

*Primary Examiner* — Aneeta Yodichkas
*Assistant Examiner* — Deeprose Subedi
(74) *Attorney, Agent, or Firm* — Nixon & Vanderhye P.C.

(57) ABSTRACT

A method of displaying an image is provided, the method including displaying an item for providing content or information regarding the content and a pointed location corresponding to a received input; determining a distance from the pointed location to the item; determining an amount or a type of information corresponding to the item to display, based on the determined distance; and displaying information corresponding to the item, based on the determined amount or type of information.

11 Claims, 15 Drawing Sheets

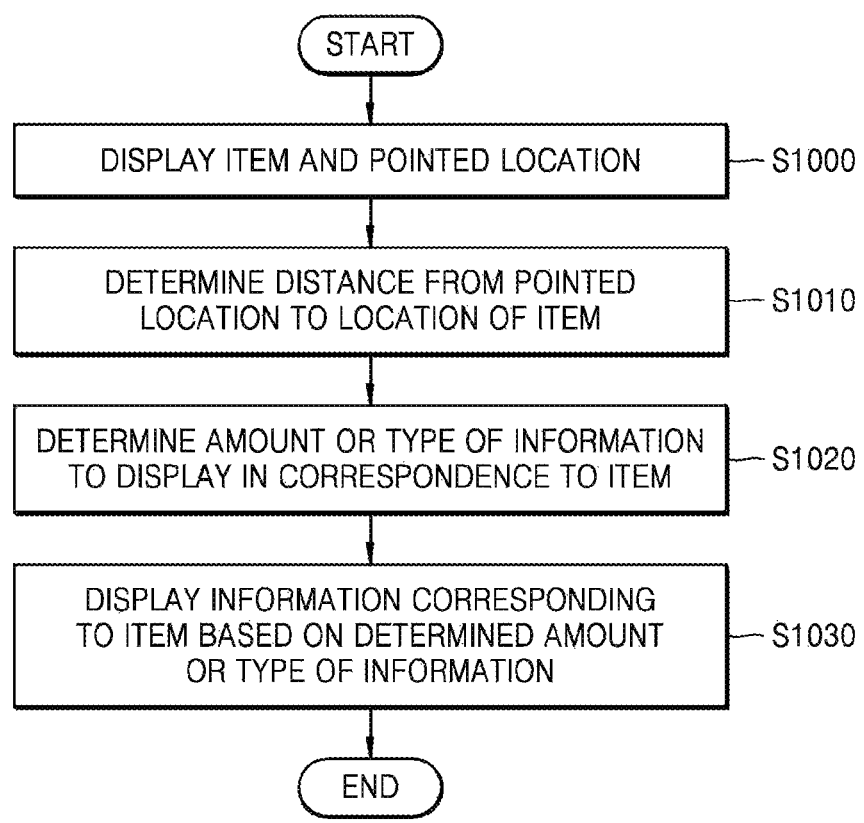

IMAGE DISPLAY APPARATUS AND METHOD OF DISPLAYING IMAGE

CROSS-REFERENCE TO RELATED APPLICATION

This application is based on and claims priority under 35 U.S.C. § 119 to Korean Patent Application No. 10-2016-0029103, filed on Mar. 10, 2016, in the Korean Intellectual Property Office, the disclosure of which is incorporated by reference herein in its entirety.

BACKGROUND

1. Field

The present disclosure relates generally to an image display apparatus and a method of displaying an image, and for example, to an image display apparatus and a method of displaying an image, which are capable of displaying an item for providing information regarding content.

2. Description of Related Art

An image display apparatus is an apparatus capable of displaying an image that may be viewed by a user. A user may watch a broadcast via the image display apparatus. The image display apparatus displays broadcast content selected by a user from among broadcast signals transmitted by broadcasting stations. Currently, broadcasting is being switched from analog broadcasting to digital broadcasting worldwide.

A digital broadcasting service refers to a broadcasting service that transmits digital images and digital voice signals. Since a digital broadcasting service is more resistant to external noise than an analog broadcasting service, a digital broadcasting service exhibits less data loss, easier error correction, higher resolutions, and clearer images. Also, unlike an analog broadcasting service, a digital broadcasting service may be a bidirectional service.

SUMMARY

An image display apparatus and a method of displaying an image, which are capable of determining an amount or a type of information to display in correspondence to an item, based on a distance between the item displayed on a display and a pointed location corresponding to a user input are provided.

Additional aspects will be set forth in part in the description which follows and, in part, will be apparent from the description.

According to an aspect of an example embodiment, an image display apparatus includes a display, configured to display an item for providing content or information regarding the content and a pointed location corresponding to an input; and a controller, configured to determine a distance from the pointed location to the item, to determine an amount or a type of information corresponding to the item to display based on the determined distance, and to control the display to display information corresponding to the item based on the determined amount or type of information.

The controller may determine to increase an amount of information corresponding to the item to display as the determined distance decreases.

The controller may determine to reduce an amount of information corresponding to the item to display as the determined distance increases.

When the determined distance is less than a certain critical value, the controller may determine to maximize an amount of information corresponding to the item to display.

The display may further display another item, and the controller may determine an item closer to the pointed location from between the two items, determine a distance from the pointed location to location of the determined closer item, determine an amount or a type of information corresponding to the determined closer item to display based on the determined distance, and control the display to display information corresponding to the determined closer item based on the determined amount or type of information.

According to another aspect of an example embodiment, a method of displaying an image is provided, the method includes displaying an item for providing content or information regarding the content and a pointed location corresponding to an input; determining a distance from the pointed location to the item; determining an amount or a type of information corresponding to the item to display based on the determined distance; and displaying information corresponding to the item based on the determined amount or type of information.

The determining of an amount or a type of information corresponding to the item to display may include determining to increase an amount of information to display as the determined distance decreases.

The determining of an amount or a type of information to display in correspondence to the item may include determining to reduce an amount of information corresponding to the item to display as the determined distance increases.

The determining of an amount or a type of information corresponding to the item to display may include, when the determined distance is less than a certain critical value, determining to maximize an amount of information corresponding to the item to display.

The method may further include displaying another item, wherein the determining of an amount or a type of information corresponding to the item to display may include determining an item closer to the pointed location from between the two items; and determining a distance from the pointed location to location of the determined closer item, determines an amount or a type of information corresponding to the determined closer item to display in based on the determined distance.

According to another aspect of an example embodiment, a non-transitory computer readable recording medium having recorded thereon a computer program for implementing the method according to an example embodiment is provided.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 10 is a flowchart illustrating an example method of displaying an image according to an example embodiment.

DETAILED DESCRIPTION

Figure 1:
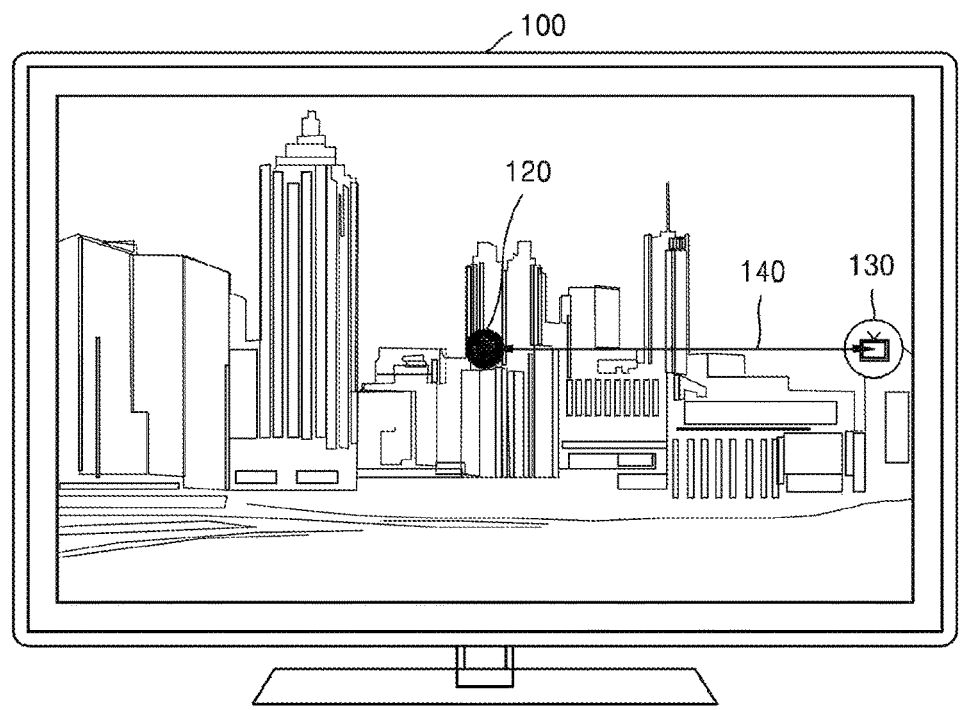
FIG. 1 is a diagram illustrating an example image display apparatus and a control device, according to an example embodiment.
Figure 1:
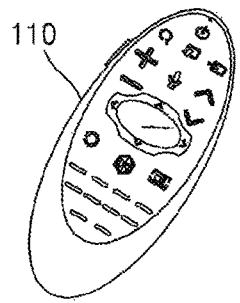

Although the terms used in the present disclosure are selected from generally known and used terms, some of the terms mentioned in the description of the present disclosure have been selected arbitrarily, the detailed meanings of which are described in relevant parts of the description herein. Furthermore, it is required that the present disclosure is understood, not simply by the actual terms used but by the meaning of each term lying within.

While such terms as "first," "second," etc., may be used to describe various components, such components must not be limited to the above terms. The above terms are used only to distinguish one component from another.

The terms used in the present disclosure are merely used to describe various example embodiments, and are not intended to limit the present disclosure. An expression used in the singular encompasses the expression of the plural, unless it has a clearly different meaning in the context. Furthermore, throughout the disclosure, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

The use of the terms "a" and "an" and "the" and similar referents in the context of describing the present disclosure (especially in the context of the following claims) are to be construed to cover both the singular and the plural. Also, the steps of all methods described herein can be performed in any suitable order unless otherwise indicated herein or otherwise clearly contradicted by context. The present disclosure is not limited to the described order of the steps.

Appearances of the phrases 'in some embodiments,' 'in certain embodiments,' in various embodiments,' and similar language throughout this disclosure may, but do not necessarily, all refer to the same embodiment, but may refer, for example, to 'one or more but not all embodiments' unless expressly specified otherwise.

The present disclosure may be described in terms of functional block components and various processing steps. Such functional blocks may be realized by any number of hardware (e.g., circuitry) and/or software components configured to perform the specified functions. For example, the present disclosure may employ various integrated circuit (IC) components, e.g., memory elements, processing elements (e.g., including processing circuitry), logic elements, look-up tables, and the like, which may carry out a variety of functions under the control of one or more microprocessors or other control devices. Similarly, where the elements of the present disclosure are implemented using software programming or software elements, the present disclosure may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

Furthermore, the connecting lines, or connectors illustrated in the various figures presented are intended to represent example functional relationships and/or physical or logical couplings between the various elements. It should be noted that many alternative or additional functional relationships, physical connections or logical connections may be present in a practical device.

Reference will now be made in greater detail to example embodiments, examples of which are illustrated in the accompanying drawings, wherein like reference numerals refer to like elements throughout. In this regard, the present example embodiments may have different forms and should not be understood as being limited to the descriptions set forth herein. Accordingly, the example embodiments are merely described below, by referring to the figures, to explain various example aspects. Expressions such as "at least one of," when preceding a list of elements, modify the entire list of elements and do not modify the individual elements of the list.

FIG. 1 is a diagram illustrating an example image display apparatus and a control device, according to an example embodiment.

As illustrated in FIG. 1, an image display apparatus 100 may be a TV. However, it is merely an example, and the image display apparatus 100 may be embodied as any of various electronic apparatuses including displays. For example, the image display apparatus 100 may be embodied as any of various electronic apparatuses including a mobile phone, a tablet personal computer (PC), a digital camera, a camcorder, a laptop computer, a desktop computer, an e-book terminal, a digital broadcast terminal, a personal digital assistant (PDA), a portable multimedia player (PM), a navigation device, a MP3 player, and a wearable device, or the like, but is not limited thereto. For example, embodiments may be easily applied to a display device including a large display 210, such as a TV. However, the present disclosure is not limited thereto. Furthermore, the image display apparatus 100 may be a stationary apparatus or a mobile apparatus and may be a digital broadcast receiver capable of receiving digital broadcasts.

A control device 110 may be embodied as any of various types of devices for controlling the image display apparatus 100, e.g., a remote controller or a mobile phone, or the like, but is not limited thereto.

Furthermore, the control device 110 may control the image display apparatus 100 via short-distance communication which may be implemented using various communication circuitry, such as, for example, and without limitation, including infrared communication or Bluetooth communication. The control device 110 may control functions of the image display apparatus 100 using various input circuitry, including, but not limited to, at least one of keys (including buttons), a touchpad, a microphone (not shown) capable of receiving a voice of a user, and a sensor (not shown) capable of recognizing a motion of the control device 110.

The control device 110 may include a power ON/OFF button for turning the image display apparatus 100 ON or OFF. Furthermore, the control device 110 may change a channel of the image display apparatus 100, adjust a volume of the image display apparatus 100, select a ground wave broadcast, a cable broadcast, or a satellite broadcast, or configure a setting.

Furthermore, the control device 110 may be a pointing device. For example, the control device 110 may function as a pointing device when a particular key input is received.

The image display apparatus 100 may be controlled by an input (e.g., a user input) for moving the control device 110 upward, downward, leftward, or rightward or tilting the control device 110 in an arbitrary direction. Information regarding a motion of the control device 110 that is detected by a sensor of the control device 110 may be transmitted to the image display apparatus 100.

The image display apparatus 100 may determine a coordinate of a pointed location on a display based on information regarding a motion of the control device 110 and move a pointed location 120 in correspondence to the determined coordinate. Therefore, the pointed location 120 on the display of the image display apparatus 100 may be moved or various displayed menus may be activated. Alternatively, when the control device 110 includes a touch pad, the pointed location 120 on the display of the image display apparatus 100 may be moved or various displayed menus may be selectively activated based on a displacement of an object moving on the touch pad, such as a finger of a user.

In various example embodiments of the present disclosure, the term "user" refers to a person who controls functions or operations of the image display apparatus 100 by using the control device 110 and may include a viewer, an administrator, or an installation technician.

Meanwhile, the image display apparatus 100 according to an example embodiment may display an item 130 for providing content or information regarding content and the pointed location 120 corresponding to an user input, on the display. Furthermore, the image display apparatus 100 according to an embodiment may determine a distance from the pointed location 120 to location of the item 130, determine an amount or a type of information to display in correspondence to the item 130 based on the determined distance, and display information corresponding to the item 130 based on the determined amount or type of information.

Based on a user input for selecting the item 130 for providing content or information regarding content, the image display apparatus 100 may display content or information regarding content. For example, an item that may be selected to play back a movie may be categorized as an item for providing content. Furthermore, an item that may be selected to display a channel guide for providing information regarding broadcast channels may be categorized as an item for providing information regarding content. The item 130 for providing content or information regarding content may include an item indicating video content, such as a movie or a drama, an item indicating audio content, such as music, an item indicating game content, an item indicating an application, an item indicating a broadcasting channel, an item indicating history information regarding content executed by a user, etc.

Furthermore, the item 130 may be displayed as an image. For example, when an item indicates content related to a movie or a drama, the item may be displayed as a movie poster image or a drama poster image. Furthermore, when an item indicates audio content, such as music, the item may be displayed as a thumbnail image of an album including the corresponding music. Furthermore, when an item indicates text content, the item may be displayed as an image including a text. Furthermore, when an item indicates an application, the item may be displayed as an image indicating the corresponding application or a screen image of the most recently executed application. Furthermore, when an item indicates a broadcasting channel, the item may be displayed as the last screen image viewed by a user in the corresponding channel or an image indicating a program currently being broadcast in the corresponding channel. Furthermore, when an item indicates history information regarding content executed by a user, the item may be displayed as the last screen image of the content executed by the user.

Although FIG. 1 illustrates that the item 130 has a circular shape, the present disclosure is not limited thereto, and shape and size of the item 130 may vary according to types and characteristics of corresponding content. Furthermore, shape and size of the item 130 may vary based on user inputs.

The pointed location 120 indicating a location corresponding to a user input may be displayed on the image display apparatus 100 when an input for touching a certain button is detected by the controller 200. Furthermore, the pointed location 120 may be moved on the image display apparatus 100 in correspondence to detected user inputs.

Although FIG. 1 illustrates that an indicator displayed in correspondence to the pointed location 120 has a circular shape, the present disclosure is not limited thereto, and shape and size of an indicator displayed in correspondence to the pointed location 120 may vary. Furthermore, shape and size of an indicator displayed in correspondence to the pointed location 120 may vary based on user inputs. However, according to an embodiment, an object displayed in correspondence to a pointed location is not limited to an indicator and may also include a cursor, a pointer, etc.

According to an embodiment, a distance 140 from the pointed location 120 to the item 130 may refer to a distance from the center of an indicator displayed at the image display apparatus 100 in correspondence to the pointed location 120 to the center of the item 130. However, the present disclosure is not limited thereto.

According to an embodiment, information to be displayed based on the determined distance 140 in correspondence to the item 130 may include a text, an image, music, video, or an application. However, the present disclosure is not limited thereto.

The image display apparatus 100 according to an embodiment may change an amount or a type of information to be displayed based on a distance from the pointed location 120 to the item 130 in correspondence to the item 130. Therefore, the image display apparatus 100 according to an embodiment may provide information corresponding to an item, based on the interest of a user by displaying different information regarding the item based on distances from a pointed location to the item. For example, when the pointed location 120 is far from the item 130, it may be determined that a user is not highly interested in the item 130, and thus the image display apparatus 100 may provide minimum information regarding the item 130, e.g., an image of the item 130 only. For example, when the pointed location 120 is moved closer to the item 130, it may be determined that the user became more interested in the item 130, and thus the image display apparatus 100 may provide more information regarding the item 130. As described above, by changing an amount or a type of information corresponding to the item 130 as the pointed location 120 becomes closer to the item 130, information regarding the item 130 may be adaptively provided in correspondence to the interest of the user.

Figure 2:
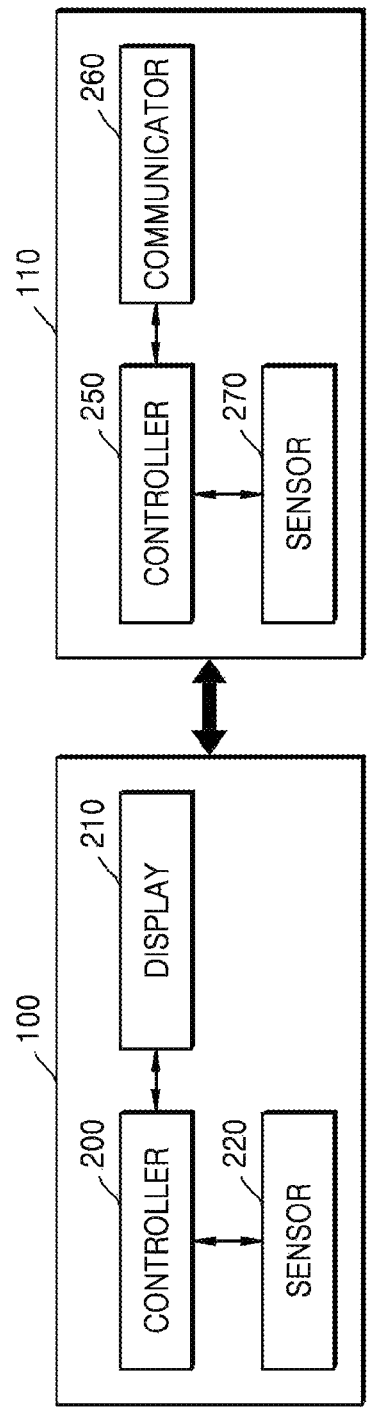
FIG. 2 is a block diagram illustrating an example configuration of an image display apparatus and a control device, according to an example embodiment.

FIG. 2 is a block diagram illustrating an example configuration of an image display apparatus and a control device according to an example embodiment.

Referring to FIG. 2, the image display apparatus 100 may include a controller (e.g., including processing circuitry) 200, a display 210, and a sensor 220.

The display 210 transforms a signal processed by the controller 200, e.g., an image signal, a data signal, an on-screen display (OSD) signal, a control signal, etc., and generates a driving signal. The display 210 may include a plasma panel display (PDP), a liquid crystal display (LCD), an organic light-emitting diode (OLED), a flexible display, or a 3D display, or the like, but is not limited thereto. Furthermore, the display 210 may include a touch screen and may be used not only as an output unit, but also as an input unit.

The display 210 according to an embodiment may display an item for providing content or information regarding content and an indicator at a pointed location corresponding to a user input. Furthermore, the display 210 may display information regarding an item according to an amount or a type of information determined based on a distance from a pointed location to location of the item. Furthermore, the display 210 may also display another item.

The sensor 220 according to an embodiment may sense a user input and transmit a sensed signal to the controller 200. The sensor 220 may sense a user input for moving a pointed location displayed on the display 210.

The controller 200 according to an embodiment may process an image signal and input the processed image signal to the display 210. Therefore, an image corresponding to the processed image signal may be displayed at the display 210. Furthermore, the controller 200 may control the image display apparatus 100 according to a user instruction sensed by the sensor 220 or an internal program.

According to an embodiment, the controller 200 may determine a distance from a pointed location to location of an item, determine an amount or a type of information to display in correspondence to the item based on the determined distance, and display information regarding the item based on the determined amount or type of information.

The controller 200 may determine to increase an amount of information to display in correspondence to an item as a distance from a pointed location to the item decreases.

The controller 200 may determine to reduce an amount of information to display in correspondence to an item as a distance from a pointed location to the item increases.

When a distance from a pointed location to location of an item is smaller than a certain critical (e.g., threshold) value, the controller 200 may determine to maximize an amount of information to display in correspondence to the item.

The controller 200 may determine an item closer to a pointed location from between two items, determine a distance from the pointed location to location of the determined item, determine an amount or a type of information to display in correspondence to the determined item based on the determined distance, and display information corresponding to the determined item based on the determined amount or type of information.

Meanwhile, referring to FIG. 2, the control device 110 according to an embodiment may include a controller (e.g., including processing circuitry) 250, a communicator (e.g., including communication circuitry) 260, and a sensor 270.

The controller 250 may include various processing circuitry that controls the overall control operation of the control device 110. The controller 250 may transmit a signal corresponding to a certain key manipulation of a user input unit 430 or a signal corresponding to a motion of the control device 110 sensed by the sensor 270 to the image display apparatus 100 via the communicator 260.

The communicator 260 may include various communication circuitry to transmit/receive a signal to/from an arbitrary one of image display apparatuses according to the above embodiments. The communicator 260 may include various communication circuitry, such as, for example, and without limitation, an RF module capable of transmitting/receiving a signal to/from the image display apparatus 100 according to the RF communication protocol. Furthermore, the control device 110 may include an IR module capable of transmitting/receiving a signal to/from the image display apparatus 100 according to the IR communication protocol.

The sensor 270 may include, for example, a gyro sensor 441 and/or an acceleration sensor 443.

Figure 3:
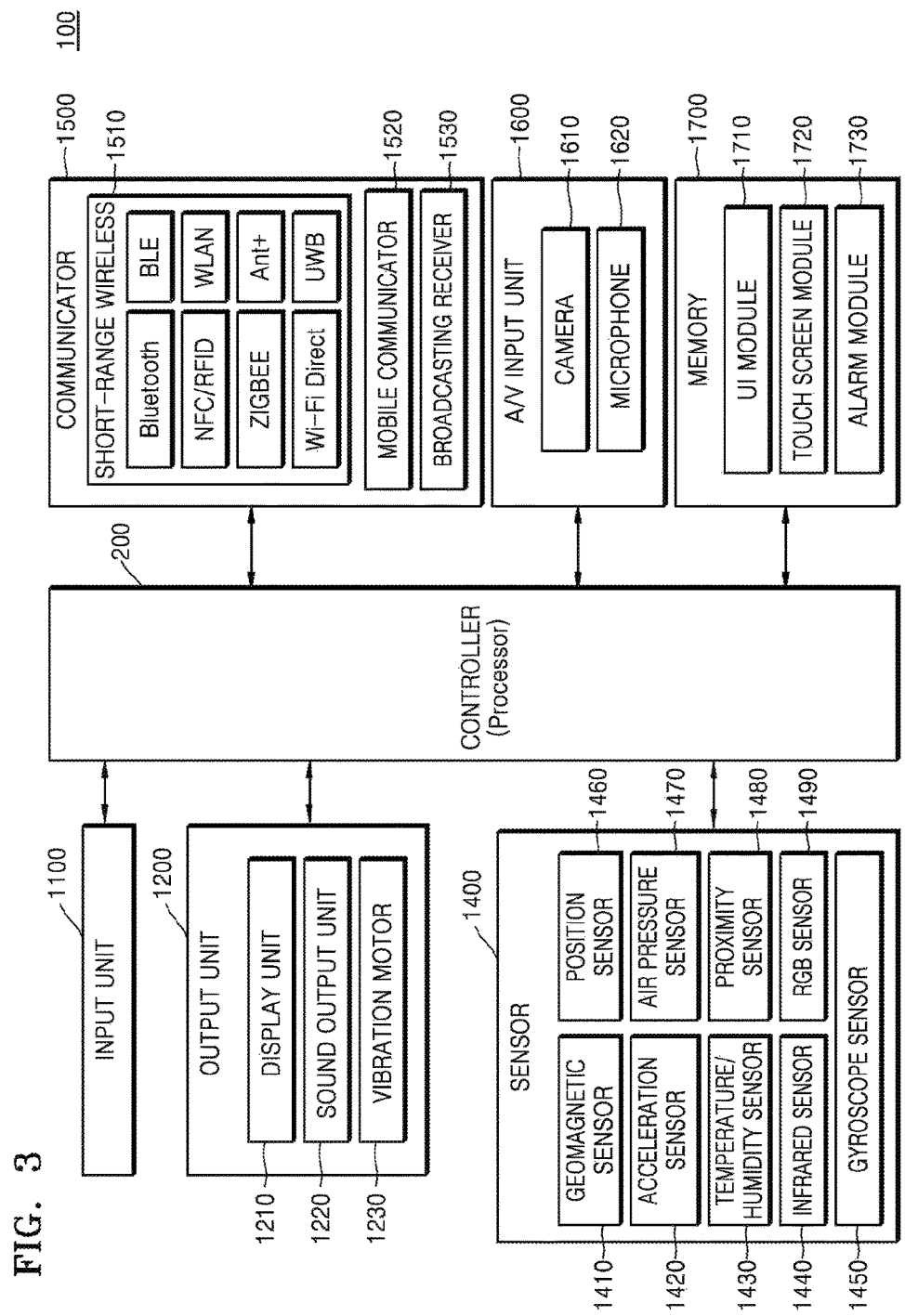
FIG. 3 is a block diagram illustrating an example configuration of an image display apparatus according to another example embodiment.

FIG. 3 is a block diagram illustrating an example configuration of an image display apparatus according to another example embodiment.

Referring to FIG. 3, the image display apparatus 100 may include an input unit (e.g., including input circuitry) 1100, an output unit (e.g., including output circuitry) 1200, the controller (e.g., including processing circuitry) 200, a communicator (e.g., including communication circuitry) 1500 and may further include the sensor 1400, an audio/video (A/V) input unit (e.g., including A/V input circuitry) 1600, and a memory 1700.

The input unit 1100 may include various input circuitry, and may refer, for example to a unit for a user to input data for controlling the image display apparatus 100.

The output unit 1200 may include various output circuitry to output an audio signal, a video signal, or a vibration signal and may include, for example, and without limitation, the display 1210, a sound output unit 1220, and a vibration motor 1230.

The display 1210 may display information processed by the image display apparatus 100. For example, the display 1210 may display an item for providing content or information regarding content and a pointed location corresponding to a user input. Furthermore, the display 1210 may display information regarding an item according to an amount or a type of information determined based on a distance from a pointed location to location of the item.

Meanwhile, when the display 1210 and a touch pad may be realized in a layered structure and configured as a touch screen, the display 1210 may be used not only as an output unit, but also as an input unit. Furthermore, according to some embodiments, the image display apparatus 100 may include two or more displays 1210.

The sound output unit 1220 may include various circuitry that outputs audio data received from the communicator 1500 or stored in the memory 1700.

The vibration motor 1230 may include circuitry configured to output a vibration signal.

The controller 200 may include various processing circuitry and generally controls the overall operation of the image display apparatus 100. For example, the controller 200 may control the input unit 1100, the output unit 1200, the sensor 1400, the communicator 1500, and the A/V input unit 1600 by executing programs stored in the memory 1700.

For example, the controller 200 may determine a distance from a pointed location to location of an item, determine an amount or a type of information to display in correspondence to the item based on the determined distance, and display information regarding the item based on the determined amount or type of information. Furthermore, the controller 200 may determine to increase an amount of information to display in correspondence to an item as a distance from a pointed location to the item decreases. Furthermore, the controller 200 may determine to reduce an amount of information to display in correspondence to an item as a distance from a pointed location to the item increases. Furthermore, when a distance from a pointed location to location of an item is smaller than a certain critical value, the controller 200 may determine to maximize an amount of information to display in correspondence to the item. Furthermore, the controller 200 may determine an item closer to a pointed location from between two items, determine a distance from the pointed location to location of the determined item, determine an amount or a type of information to display in correspondence to the determined item based on the determined distance, and display information corresponding to the determined item based on the determined amount or type of information.

The sensor 1400 may include various circuitry/sensors to sense a state of the image display apparatus 100 or conditions surrounding the image display apparatus 100 and transmit information about the sensed state or surrounding conditions to the controller 200. For example, and without limitation, the sensor 1400 may include a geomagnetic sensor 1410, an acceleration sensor 1420, a temperature/humidity sensor 1430, an infrared sensor 1440, a gyroscope sensor 1450, a position sensor 1460, an air pressure sensor 1470, a proximity sensor 1480, a color (e.g., RGB) sensor 1490, or the like, but is not limited thereto.

The communicator 1500 may include various communication circuitry in the form of one or more components that enables a communication between the image display apparatus 100 and a head mounted display (HMD) or between the image display apparatus 100 and a server, for example, the communicator 1500 may include short-range wireless communication circuitry 1510, a mobile communicator including various mobile communication circuitry 1520, and a broadcast receiver 1530. The short-range wireless communication circuitry 1510 may include various communication circuitry, such as, for example, and without limitation, Bluetooth, BLE, NFC/RFID, WLAN, Zigbee, Ant+, Wi-Fi direct, UWB, or the like.

The A/V input unit 1600 may include various A/V input circuitry for inputting an audio signal or a video signal and may include, for example, a camera 1610 and a microphone 1620.

The memory 1700 may store programs for processing operations and controlling operations of the controller 200 and may store data input to the image display apparatus 100 or output by the image display apparatus 100. The memory 1700 may include various program modules, such as, for example, and without limitation, a UI module 1710, a touch screen module 1720, and an alarm module 1730.

A alarm module 1730 may, for example, generate a signal for notifying occurrence of an event at the image display apparatus 100.

Figure 4:
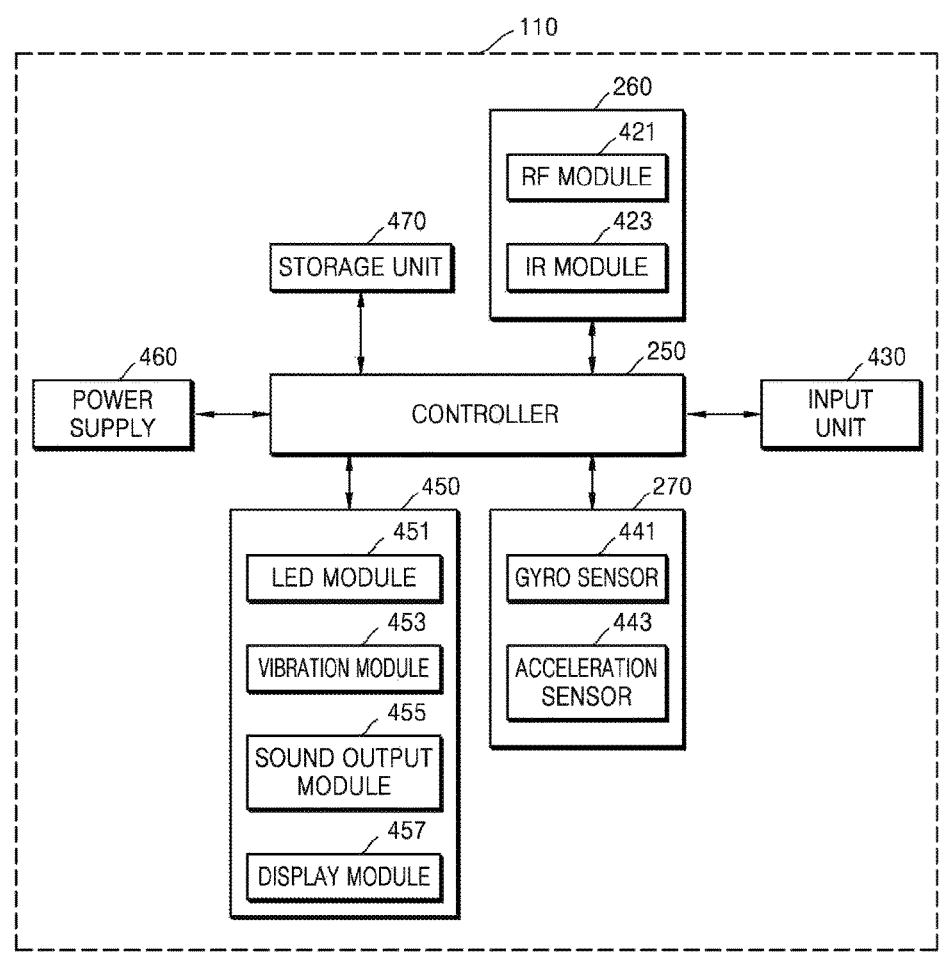
FIG. 4 is a block diagram illustrating an example configuration of a control device according to another example embodiment.

FIG. 4 is a block diagram illustrating an example configuration of a control device according to another example embodiment.

Referring to FIG. 4, the control device 110 may include the communicator (e.g., including communication circuitry) 260, the input unit (e.g., including input circuitry) 430, the sensor 270, an output unit (e.g., including output circuitry) 450, a power supply 460, a storage unit 470, and the controller (e.g., including processing circuitry) 250.

The communicator 250 may include various communication circuitry configured to transmit/receive a signal to/from an arbitrary one of image display apparatuses according to the above embodiments. The communicator 260 may include various communication circuitry, such as, for example, and without limitation, an RF module 421 capable of transmitting/receiving a signal to/from the image display apparatus 100 according to the RF communication protocol, an IR module 423 capable of transmitting/receiving a signal to/from the image display apparatus 100 according to the IR communication protocol, or the like.

The input unit 430 may include various input circuitry for receiving an input from a user, such as, for example, and without limitation, a keypad, a button, a touch pad, or a touch screen, or the like. A user may input an instruction related to the image display apparatus 100 to the control device 110 by manipulating the user input unit 430.

The sensor 270 may include various sensors including, but not limited to, a gyro sensor 441 and/or an acceleration sensor 443. The gyro sensor 441 may sense information regarding a motion of the control device 110. The acceleration sensor 443 may sense information regarding a moving speed of the control device 110. Meanwhile, the sensor 270 may further include a distance measuring sensor and may sense a distance to the image display apparatus 100 by using the same.

The output unit 450 may include various circuitry configured to output an image signal or a voice signal corresponding to a manipulation of the input unit 430 or a signal received from the image display apparatus 100.

The power supply 460 supplies power to the control device 110.

The storage unit 470 may store various types of programs and application data for controlling or operating the control device 110.

The controller 250 may include various processing circuitry that controls the overall control operation of the control device 110. The controller 250 may transmit a signal corresponding to a certain key manipulation of an input unit 430 or a signal corresponding to a motion of the control device 110 sensed by the sensor 270 to the image display apparatus 100 via the communicator 260.

The image display apparatus 100 may include a coordinate calculator (not shown) capable of determining a coordinate of a pointed location corresponding to a manipulation of the control device 110. The coordinate calculator may determine a coordinate value (x, y) of a pointed location to be displayed on the display 210 by compensating for hand shake or correcting an error of a signal corresponding to a sensed manipulation of the control device 110.

Figure 5:
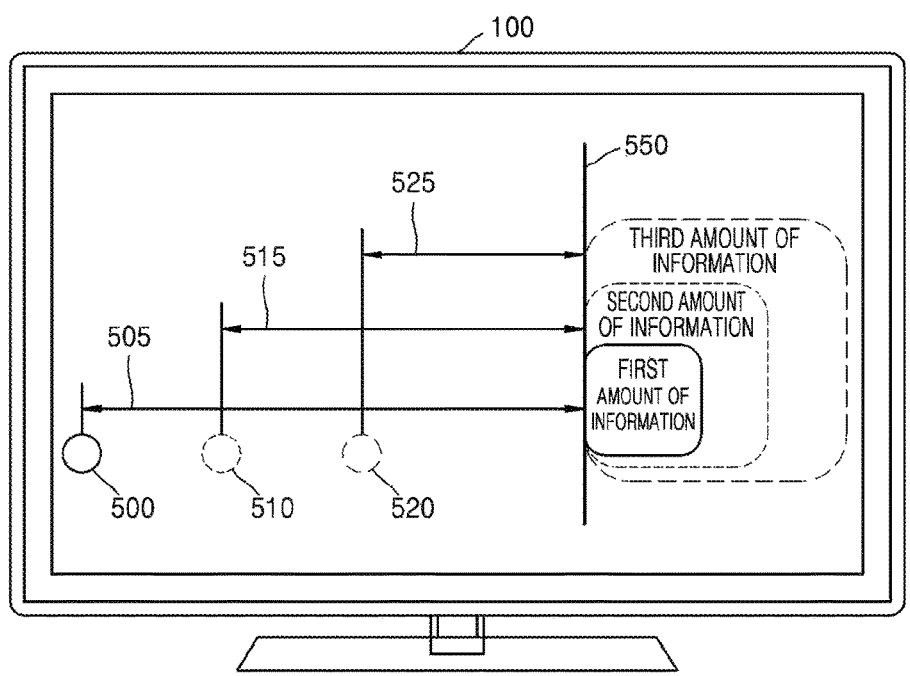
FIG. 5 is a diagram illustrating an example relationship between a distance from a pointed location to an item and an amount of information to be displayed in correspondence to the item, according to an example embodiment.

FIG. 5 is a diagram illustrating an example relationship between a distance from a pointed location to an item and an amount of information to be displayed in correspondence to the item, according to an example embodiment.

According to an example embodiment, the image display apparatus 100 may determine a distance from a pointed location to location of an item, determine an amount or a type of information to display in correspondence to the item based on the determined distance, and display information regarding the item based on the determined amount or type of information. Furthermore, the image display apparatus 100 may determine to increase an amount of information to display in correspondence to an item as a distance from a pointed location to the item decreases. Furthermore, the image display apparatus 100 may determine to reduce an amount of information to display in correspondence to an item as a distance from a pointed location to the item increases.

According to an example embodiment, a distance from a pointed location to an item may refer to a distance from the center of the pointed location to the center of the item. However, the present disclosure is not limited thereto.

According to an example embodiment, information to be displayed based on a determined distance in correspondence to an item may include a text, an image, music, video, or an application. However, the present disclosure is not limited thereto.

Referring to FIG. 5, when a distance from a first pointed location 500 to an item 550 is a first distance 505, the image display apparatus 100 determines a first amount of information. Furthermore, when a distance from a second pointed location 510 to the item 550 is a second distance 515, the image display apparatus 100 determine a second amount of information. Furthermore, when a distance from a third pointed location 520 to the item 550 is a third distance 525, the image display apparatus 100 determine a third amount of information. According to an embodiment, the second distance 515 is smaller than the first distance 505, and the third distance 525 is smaller than the second distance 515. The second amount of information includes more information than the first amount of information, and the third amount of information includes more information than the second amount of information.

FIG. 5 illustrates an example in which an amount of information displayed in correspondence to an item increases as a distance from a pointed location to the item decreases.

For example, when information to be displayed based on a determined distance in correspondence to an item is text information, a first amount of information may include the title of the text information, a second amount of information may include the table of content of the text information, and a third amount of information may include a part of the main content of the text information.

Furthermore, when information to be displayed based on a determined distance in correspondence to an item is an image, the information may be a resolution or a screen image size, but is not limited thereto. For example, resolution of an image displayed on the image display apparatus 100 may increase as an amount of information increases from a first amount of information to a second amount of information and from a second amount of information to a third amount of information.

Figure 6:
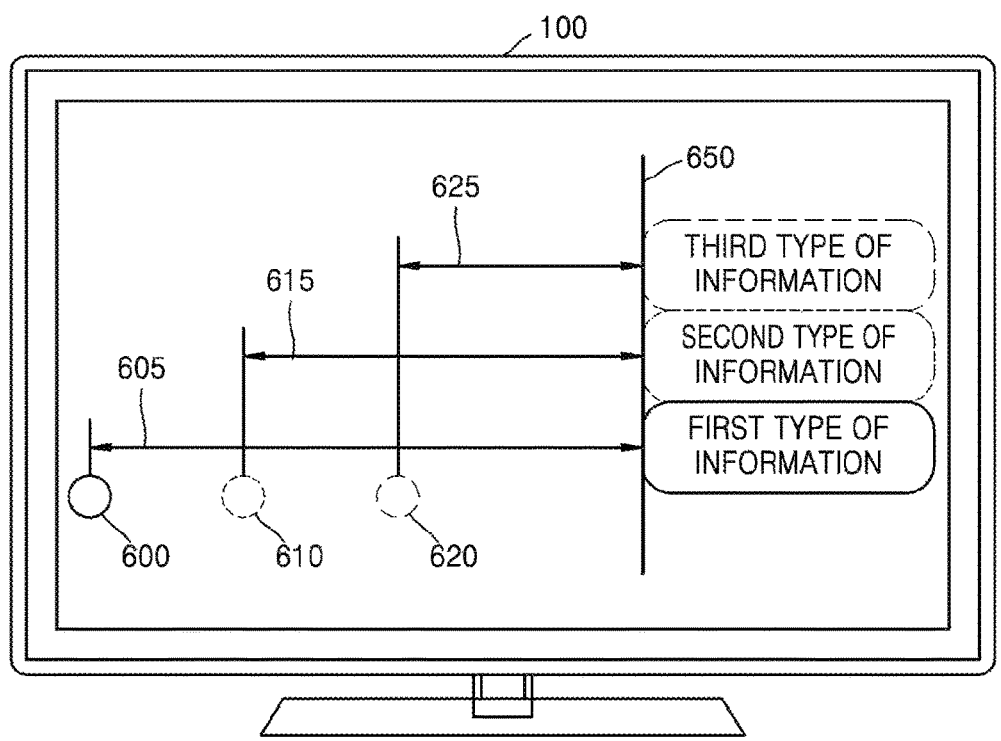
FIG. 6 is a diagram illustrating an example relationship between a distance from a pointed location to location of an item and a type of information to be displayed in correspondence to the item, according to an example embodiment.

FIG. 6 is a diagram illustrating an example relationship between a distance from a pointed location to location of an item and a type of information to be displayed in correspondence to the item, according to an example embodiment.

According to an embodiment, the image display apparatus 100 may determine a distance from a pointed location to location of an item, determine a type of information to display in correspondence to the item based on the determined distance, and display information regarding the item based on the determined type of information.

Referring to FIG. 6, when a distance from a first pointed location 600 to an item 650 is a first distance 605, the image display apparatus 100 determines a first type of information. Furthermore, when a distance from a second pointed location 610 to the item 650 is a second distance 615, the image display apparatus 100 determine a second type of information. Furthermore, when a distance from a third pointed location 620 to the item 650 is a third distance 625, the image display apparatus 100 determine a third type of information.

FIG. 6 illustrates an example in which a type of information displayed in correspondence to an item is changed as a distance from a pointed location to the item decreases.

For example, when information to be displayed on the image display apparatus 100 based on the first distance 605 in correspondence to an item is text information, a first type of information is text. Meanwhile, when the first type of information is text, a second type of information may be an image. Furthermore, when the second type of information is the image, a third type of information may be video. In detail, when the first type of information is text and includes a title of a movie or a plot of the movie, the second type of information may be the image and include an image of a scene in the movie, and the third type of information may be video and include video data of the movie.

Figure 7:
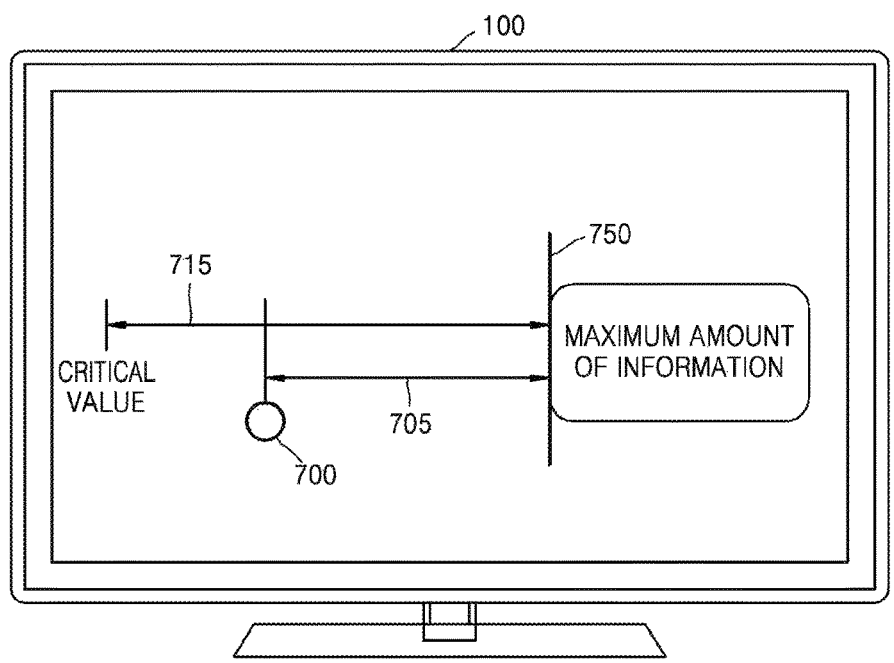
FIG. 7 is a diagram illustrating an example in which an amount or a type of information to display in correspondence to an item is determined when a distance from a pointed location to the item is less than a certain critical value.

FIG. 7 is a diagram illustrating an example in which an amount or a type of information to display in correspondence to an item is determined when a distance from a pointed location to the item is less than a certain critical (e.g., threshold) value.

According to an embodiment, when a determined distance is less than a certain critical value, the image display apparatus 100 may determine to maximize an amount of information to display in correspondence to the item.

Referring to FIG. 7, when a distance 705 from a first pointed location 700 to an item 750 is less than a certain critical value 715, the image display apparatus 100 determines information to display in correspondence to the item 750 at a maximum amount. In other words, when the distance 705 from the first pointed location 700 to location of the item 750 is less than the critical value 715, information displayed by the image display apparatus 100 is not changed even when the distance 705 from the first pointed location 700 to the item 750 is further reduced.

A certain critical value may be controlled based on a user input or may be pre-set in the image display apparatus 100.

FIGS. 8A through 8F are diagrams illustrating an example in which an amount or a type of information to display in correspondence to an item is determined based on a distance from a pointed location to location of the item.

Figure 8A:
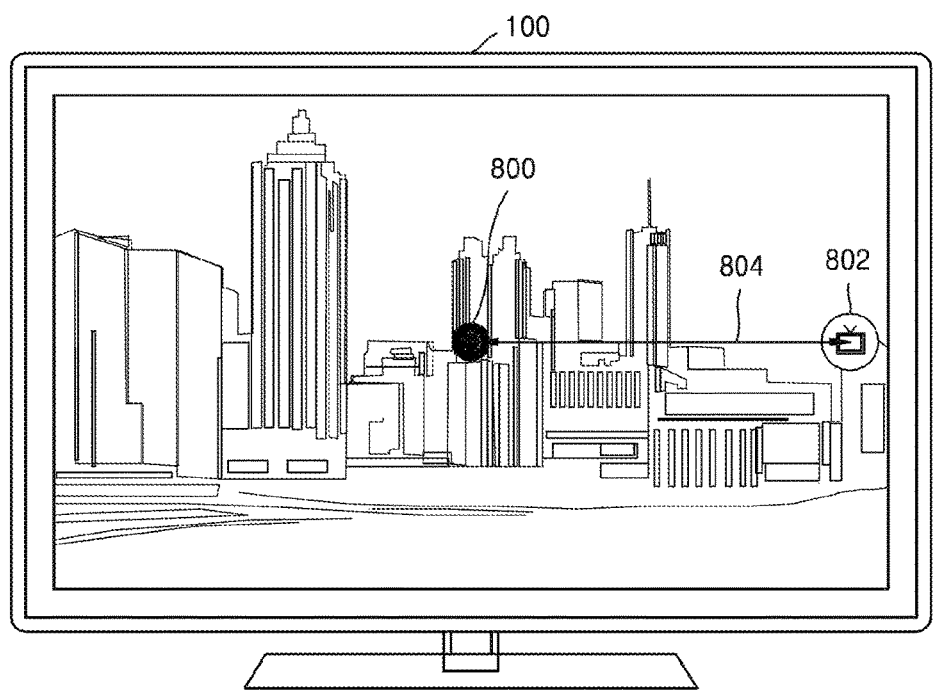
FIGS. 8A, 8B, 8C, 8D, 8E and 8F are diagrams illustrating an example in which an amount or a type of information to display in correspondence to an item is determined based on a distance from a pointed location to location of the item.
Figure 8B:
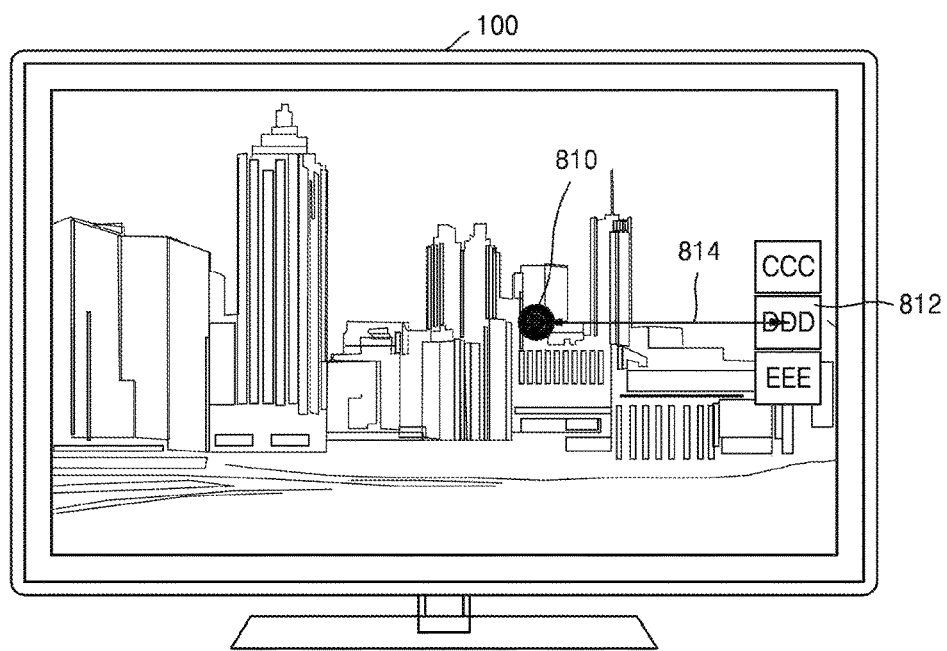
Figure 8C:
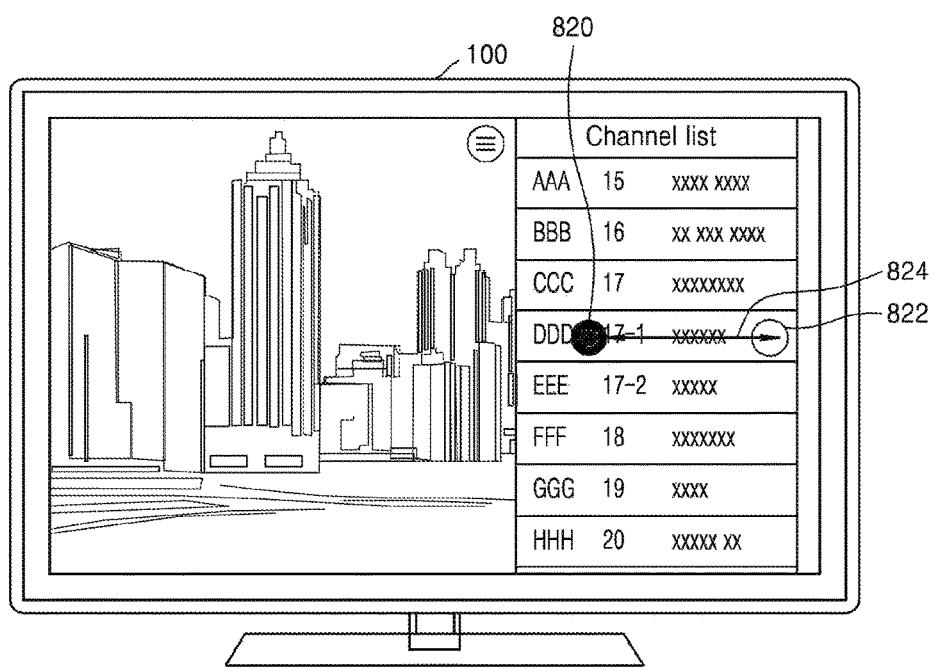
Figure 8D:
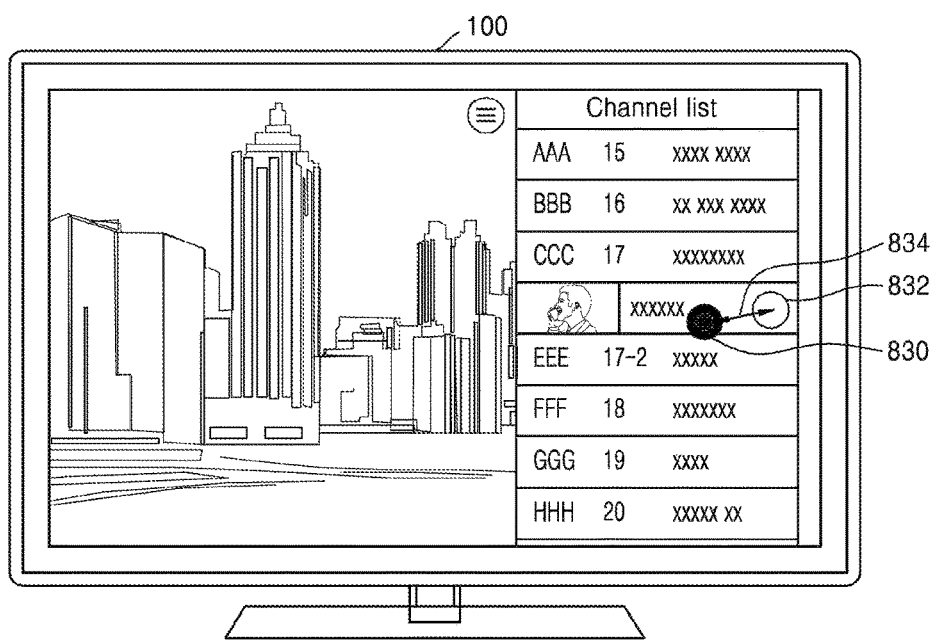
Figure 8E:
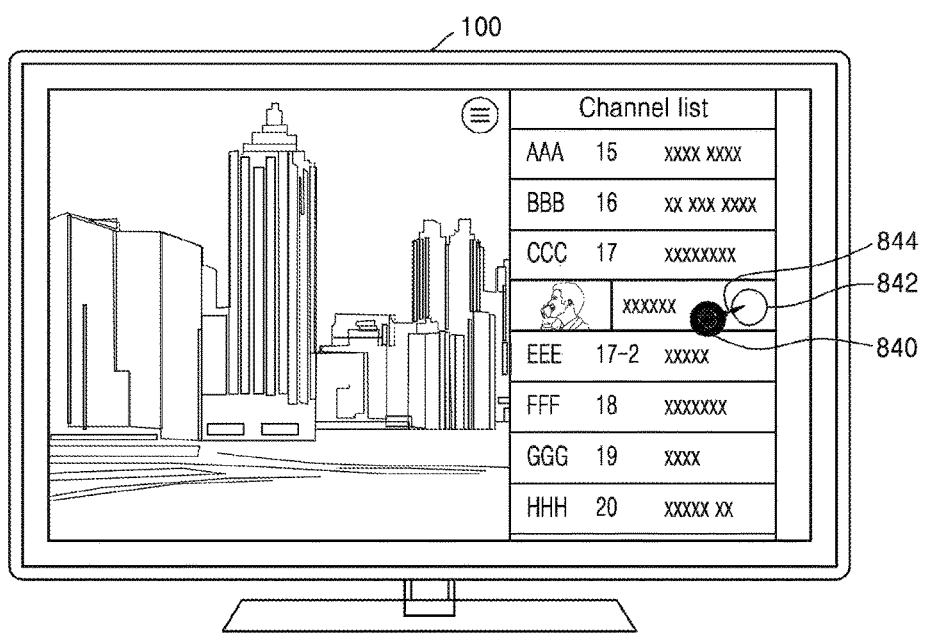
Figure 8F:
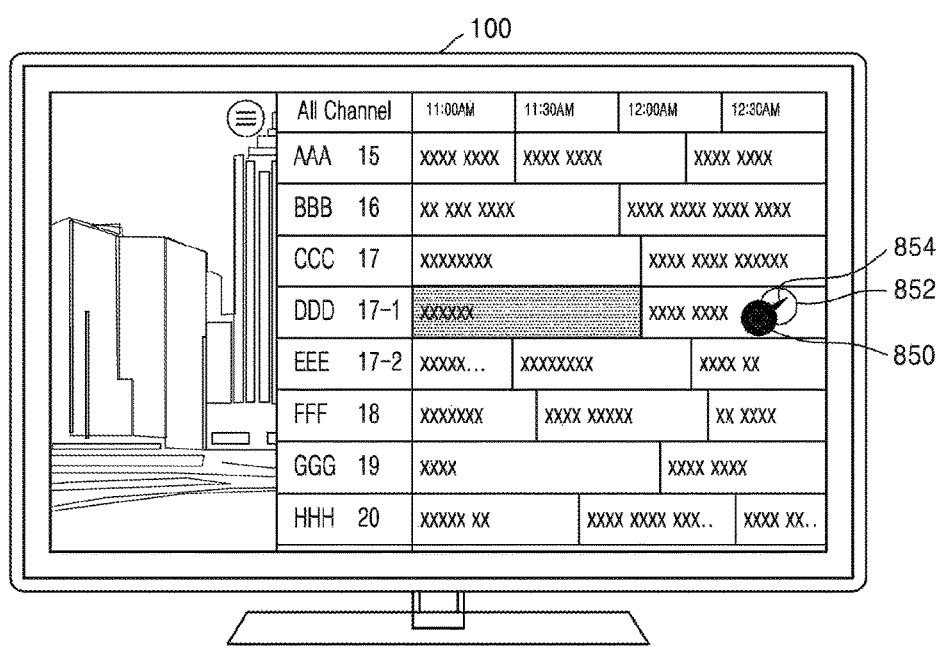

Referring to FIG. 8A, a distance from a pointed location 800 to an item 802 is a first distance 804. Referring to FIG. 8B, a distance from a pointed location 810 to an item 812 is a second distance 814. Referring to FIG. 8C, a distance from a pointed location 820 to an item 822 is a third distance 824. Referring to FIG. 8D, a distance from a pointed location 830 to an item 832 is a fourth distance 834. Referring to FIG. 8E, a distance from a pointed location 840 to an item 842 is a fifth distance 844. Referring to FIG. 8F, a distance from a pointed location 850 to an item 852 is a sixth distance 854. Referring to FIGS. 8A through 8F, distances from pointed locations to items decrease in the order from the first distance 804 to the sixth distance 854.

Meanwhile, referring to FIGS. 8A through 8F, items for determining distances from pointed locations to locations of items may differ. For example, in FIG. 8A, the item 802 may be an image for providing information regarding an electronic program guide (EPG). In FIG. 8B, the item 812 may indicate a list of broadcasting stations. In FIGS. 8C through 8F, the items 822, 832, 842, and 852 may indicate particular icons included in a list of channels.

Referring to FIG. 8A, when a distance from the pointed location 800 to a location of the item 802 is the first distance 804 exceeding a certain critical value, the image display apparatus 100 may display the item 802.

Furthermore, referring to FIG. 8B, when a distance from the pointed location 810 to the item 812 is the second distance 814 and the second distance 814 is smaller than the first distance 804, the image display apparatus 100 may determine a part of a list of the names of broadcasting stations as information to display in correspondence to the item 812 and displays the part of the list of the names of the broadcasting stations.

Furthermore, referring to FIG. 8C, when a distance from the pointed location 820 to the item 822 is the third distance 824 and the third distance 824 is smaller than the second distance 814, the image display apparatus 100 determines a list of the names of broadcasting stations and names of programs as information to display in correspondence to the item 822 and displays the list of the names of the broadcasting stations and the names of the programs.

Furthermore, referring to FIG. 8D, when a distance from the pointed location 830 to location of the item 832 is the fourth distance 834 and the fourth distance 834 is smaller than the third distance 824, the image display apparatus 100 may determine a preview image of a program as information to display in correspondence to the item 832 and displays the preview image of the program.

Furthermore, referring to FIG. 8E, when a distance from the pointed location 840 to location of the item 842 is the fifth distance 844 and the fifth distance 844 is smaller than the fourth distance 834, the image display apparatus 100 may determine a preview image of a program as information to display in correspondence to the item 842 and displays the preview image of the program.

Furthermore, referring to FIG. 8F, when a distance from the pointed location 850 to the item 852 is the sixth distance 854 and the sixth distance 854 is smaller than the fifth distance 844, the image display apparatus 100 determines entire EPG information as information to display in correspondence to the item 852 and displays the EPG information.

According to the examples illustrated in FIGS. 8A through 8F, by changing an amount or a type of information corresponding to an item as a distance from a pointed location to the item decreases, information regarding the item may be adaptively provided in correspondence to the interest of a user.

Figure 9:
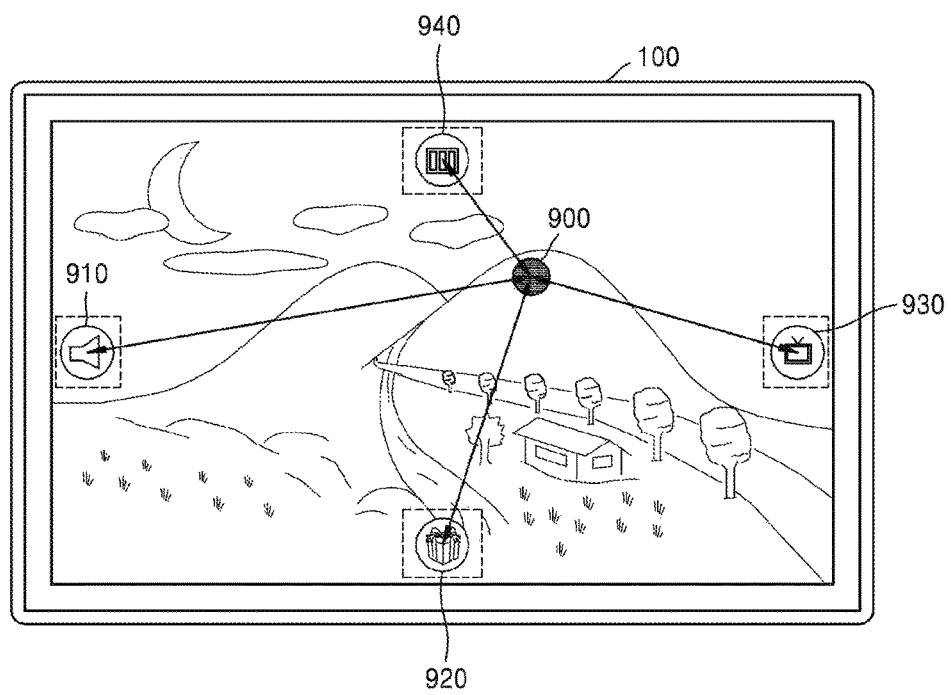
FIG. 9 is a diagram illustrating an example of determining an amount or a type of information to display in correspondence to an item when there are a plurality of items.

FIG. 9 is a diagram illustrating an example of determining an amount or a type of information to display in correspondence to an item when there are a plurality of items.

According to an embodiment, the image display apparatus 100 may display a plurality of items, determines an item closest to a pointed location from among the plurality of items, determines a distance from the pointed location to the determined item, determines an amount or a type of information to display in correspondence to the determined item based on the determined distance, and display information corresponding to the determined item based on the determined amount or type of information.

Referring to FIG. 9, the image display apparatus 100 displays four items, where a first item 910 is an image for controlling volume of the image display apparatus 100, a second item 920 is an image for controlling a screen image mode of the image display apparatus 100, a third item 930 is an image for providing EPG information, and a fourth item 940 is an image for setting other options of the image display apparatus 100.

The image display apparatus 100 determine an item closest to a pointed location 900 from among the four items 910, 920, 930, and 940. Referring to FIG. 9, the image display apparatus 100 determines the fourth item 940 as the item closest to the pointed location 900 from among the four items 910, 920, 930, and 940. Furthermore, the image display apparatus 100 may determine a distance from the pointed location 900 to the determined fourth item 940, determine an amount or a type of information to display in correspondence to the determined fourth item 940 based on the determined distance, and display information corresponding to the determined fourth item 940 based on the determined amount or type of information.

FIG. 10 is a flowchart illustrating an example method of displaying an image according to an example embodiment.

In operation S1000, the image display apparatus 100 may display an item for providing content or information regarding content and an indicator at a pointed location corresponding to a user input. An item for providing content or information regarding content may include an item indicating video content, such as a movie or a drama, an item indicating audio content, such as music, an item indicating game content, an item indicating an application, an item indicating a broadcasting channel, an item indicating history information regarding content executed by a user, etc.

A pointed location indicating location of a user input may be displayed at the image display apparatus 100 when a control device senses an input for touching a certain button. Furthermore, a pointed location may be moved on the image display apparatus 100 in correspondence to sensed user inputs.

The image display apparatus 100 may also display another item.

In operation S1010, the image display apparatus 100 may determine a distance from a pointed location to location of an item.

According to an embodiment, a distance from a pointed location to an item may refer to a distance from the center of the pointed location displayed on the image display apparatus 100 to the center of the item. However, the present disclosure is not limited thereto.

In operation S1020, the image display apparatus 100 may determine an amount or a type of information to display in correspondence to an item based on a determined distance.

The image display apparatus 100 may determine to increase an amount of information to display in correspondence to an item as a distance from a pointed location to the item decreases. Furthermore, the image display apparatus 100 may determine to reduce an amount of information to display in correspondence to an item as a distance from a pointed location to the item increases. Furthermore, when a distance from a pointed location to location of an item is smaller than a certain critical value, the image display apparatus 100 may determine to maximize an amount of information to display in correspondence to the item.

In operation S1030, the image display apparatus 100 may display information regarding an item based on a determined amount or type of information.

The example embodiments described above may be written as computer programs and can be implemented in dedicated processing circuitry or general-use digital computers that execute the programs using a computer-readable recording medium. In addition, a structure of data used in the methods may be recorded in a computer-readable recording medium in various ways. Furthermore, one or more example embodiments may be implemented by a computer-readable recording medium, such as a program module executed by a computer. When software modules or algorithms are involved, these software modules may be stored as program instructions or computer readable codes executable on a processor on a computer-readable medium.

A non-transitory computer-readable medium may be an arbitrary medium that may be accessed by a computer, and includes volatile and nonvolatile media and separable and non-separable media. Examples of the non-transitory computer-readable medium may include recording media, such as magnetic storage media (e.g., ROM, floppy disks, hard disks, etc.) and optical recording media (e.g., CD-ROMs or DVDs), but are not limited thereto. Also, the non-transitory computer-readable medium may include a computer recording medium and a communication medium.

Furthermore, a plurality of non-transitory computer-readable media may be distributed in computer systems connected to one another via a network, and data stored in the distributed non-transitory computer-readable media, e.g., program instructions and codes, may be executed by at least one computer.

The various example embodiments illustrated and described herein are illustrative examples of the present disclosure and are not intended to otherwise limit the scope of the present disclosure in any way. For the sake of brevity, conventional electronics, control systems, software development and other functional aspects of the systems may not be described in detail.

While the disclosure has been particularly illustrated and described with reference to example embodiments thereof, it will be understood by those of ordinary skill in the art that various changes in form and details may be made therein without departing from the spirit and scope of the disclosure as defined by the following claims. Hence, it will be understood that the example embodiments described above are not limiting the scope of the disclosure. For example, each component described in a single type may be executed in a distributed manner, and components described distributed may also be executed in an integrated form.

The use of any and all examples, or example language (e.g., "such as") provided herein, is intended merely to better illuminate the present disclosure and does not pose a limitation on the scope of the present disclosure unless otherwise claimed.

Moreover, no item or component is essential to the practice of the present disclosure unless the element is specifically described as "essential" or "critical".

As the present disclosure allows for various changes and numerous example embodiments, particular embodiments have been illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. Therefore, it should be understood that the example embodiments described herein should be considered in a descriptive sense only and not for purposes of limitation.

The scope of the disclosure is indicated by the claims which will be described in the following rather than the detailed description, and it should be understood that the claims and all modifications or modified forms drawn from the concept of the claims are included in the scope of the disclosure.

The terms "-er", "-or", and "module" described in the disclosure may refer, for example, to units for processing at least one function and operation and can be implemented by hardware components (e.g., circuitry) and/or software components and combinations thereof.

The "units or "modules may be embodied by programs that are stored in an addressable storage medium and may be executed by a processor.

For example, the "units" or "modules" may include components, such as software components, object-oriented software components, class components, and task components, processes, functions, properties, procedures, subroutines, program code segments, drivers, firmware, micro codes, circuits, data, databases, data structures, tables, arrays, and variables. Components and functions provided in the "units" may be combined to smaller numbers of components and "units" or may be further divided into larger numbers of components and "units."

What is claimed is:

1. An image display apparatus comprising:
a display; and
a controller configured to:
control the display to display an item for providing content and/or information regarding the content, and a pointer on a location corresponding to a received input,
identify a distance from the location of the pointer to a location of the item,
when the distance is longer than a first distance, control the display to display an identifier of a channel currently being viewed,
when the distance is shorter than or equal to the first distance and longer than a second distance, control the display to display a list of channel identifiers, wherein the first distance is greater than the second distance, and
when the distance is shorter than or equal to the second distance, control the display to display an Electronic Program Guide.

2. The image display apparatus of claim 1, wherein the controller is further configured to control the display to display an increased amount of information corresponding to the item as the identified distance decreases.

3. The image display apparatus of claim 1, wherein the controller is further configured to control the display to display a reduced amount of information corresponding to the item as the identified distance increases.

4. The image display apparatus of claim 1, wherein, when the identified distance is less than a threshold critical value, the controller is further configured to control the display to display a maximized amount of information corresponding to the item.

5. The image display apparatus of claim 1, wherein the controller is further configured to:
control the display to display another item for providing other content and/or other information regarding the other content, identify a distance from the location of the pointer to a location of the another item, identify which of the item and the another item is closer to the location of the pointer, when the another item is identified as being closer to the location of the pointer and the distance from the location of the pointer to the location of the another item is longer than a third distance, control the display to display the other content and/or the other information regarding the other content corresponding to the another item, and when the another item is identified as being closer to the location of the pointer and the distance from the location of the pointer to the location of the another item is shorter than or equal to the third distance, control the display to display an increased amount of the other information corresponding to the another item.

6. A method of displaying an image, the method comprising:

displaying an item for providing content and/or information regarding the content and a pointer on a location corresponding to a received input;

identifying a distance from the location of the pointer to a location of the item;

when the distance is longer than a first distance, displaying an identifier of a channel currently being viewed, when the distance is shorter than or equal to the first distance and longer than a second distance, displaying a list of channel identifiers, wherein the first distance is greater than the second distance, and when the distance is shorter than or equal to the second distance, displaying an Electronic Program Guide.

7. The method of claim 6, further comprising displaying an increased amount of the information corresponding to the item as the identified distance decreases.

8. The method of claim 6, further comprising displaying a reduced amount of the information corresponding to the item as the identified distance increases.

9. The method of claim 6, further comprising, when the identified distance is less than a threshold critical value, displaying a maximized amount of the information corresponding to the item.

10. The method of claim 6, further comprising:

displaying another item for providing other content and/or other information regarding the other content, identifying a distance from the location of the pointer to a location of the another item, identifying which of the item and the another item is closer to the location of the pointer, when the another item is identified as being closer to the location of the pointer and the distance from the location of the pointer to the location of the another item is longer than a third distance, displaying the other content and/or the other information regarding the other content corresponding to the another item, and when the another item is identified as being closer to the location of the pointer and the distance from the location of the pointer to the location of the another item is shorter than or equal to the third distance, displaying an increased amount of the other information corresponding to the another item.

11. A computer program product comprising a computer readable non-transitory storage medium having a computer readable program stored therein, wherein the computer readable program, when executed on a computing device, is configured to cause the computing device to:

display an item for providing content and/or information regarding the content, and a pointer on a location corresponding to a received input, identify a distance from the location of the pointer to a location of the item, when the distance is longer than a first distance, display an identifier of a channel currently being viewed, when the distance is shorter than or equal to the first distance and longer than a second distance, display a list of channel identifiers, wherein the first distance is greater than the second distance, and when the distance is shorter than or equal to the second distance, display an Electronic Program Guide.

* * * * *